J. B. HARRISS.
METHOD AND APPARATUS FOR SEPARATING LEAVES FROM PACKAGES.
APPLICATION FILED APR. 12, 1917.
1,328,735. Patented Jan. 20, 1920.
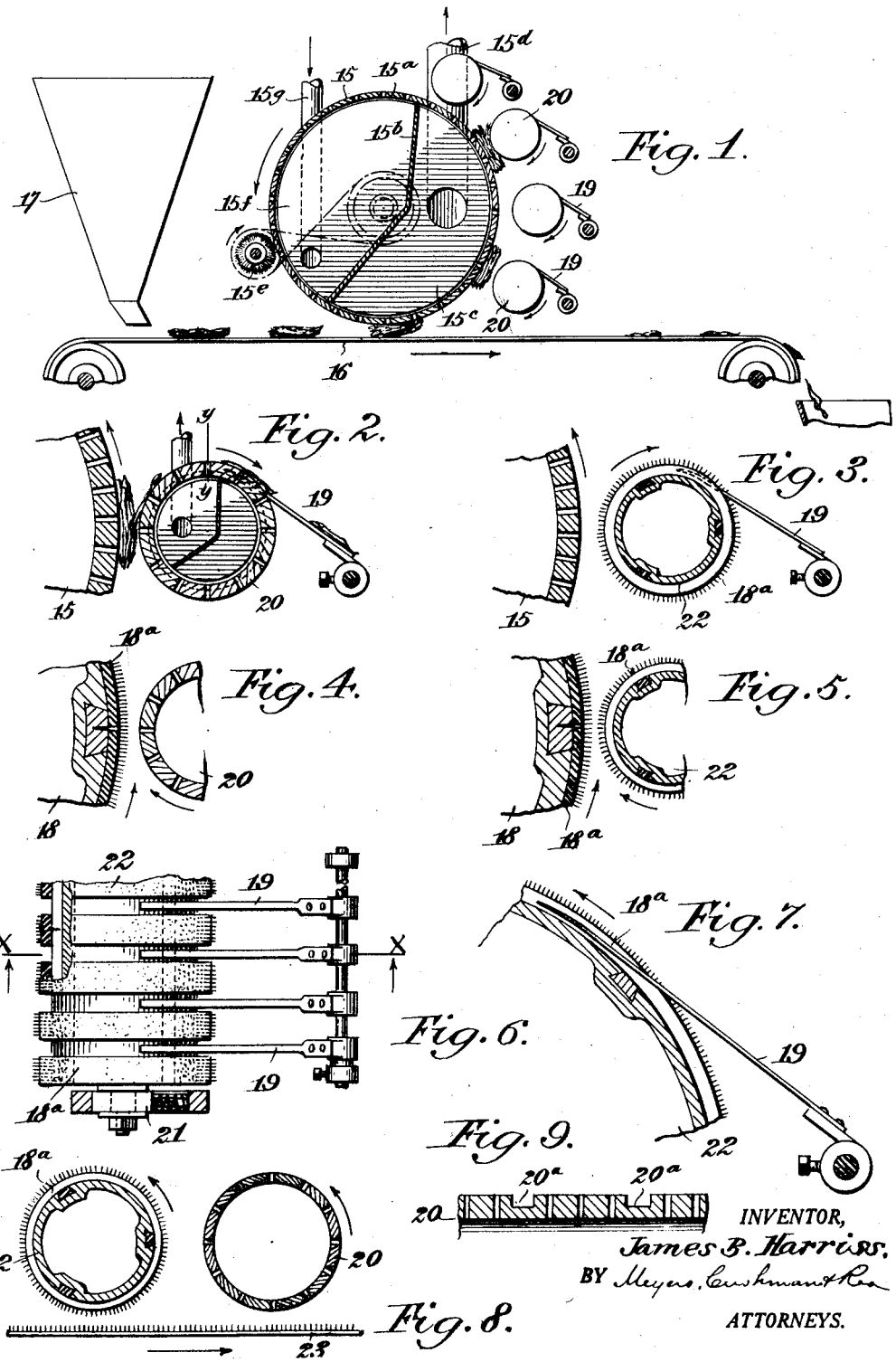
INVENTOR,
James B. Harriss.
BY Meyers, Cushman & Rea
ATTORNEYS.

UNITED STATES PATENT OFFICE.

JAMES B. HARRISS, OF NEWARK, NEW JERSEY.

METHOD AND APPARATUS FOR SEPARATING LEAVES FROM PACKAGES.

1,328,735. Specification of Letters Patent. Patented Jan. 20, 1920.

Application filed April 12, 1917. Serial No. 161,542.

*To all whom it may concern:*

Be it known that JAMES B. HARRISS, a citizen of the United States, residing at Newark, in the county of Essex and State of New Jersey, has invented certain new and useful Improvements in Methods and Apparatus for Separating Leaves from Packages, of which the following is a specification.

The present invention relates to the art of "picking" packs of leaf tobacco, and pertains more particularly to methods and apparatus for producing mechanical "picking" action in contradistinction to the general hand "picking" operation.

Imported leaf tobacco is generally transported in the form of bales in which the leaves—ranging from ¾ inch to 12 inches in length—become facially united, adhesively or cohesively, through the manner in which the leaves are packed, the baling pressure, and the action of the sap of the leaves during such curing action as may take place between the time of packing the bale and the time when the bale is opened at the manufactory. The time length of this period may extend over several years, during which period a more or less leaf-curing action takes place. The manufacturer, to properly use the tobacco, generally operates with comparatively thin pack portions or leaf layers which may be composed of a single leaf or a plurality of leaves, and it is therefore necessary that the contents of the bale be reduced to this condition and at the same time preserve as far as possible the general leaf characteristics, it being essential that the amount of scrap be reduced to a minimum.

The practice, prior to my inventions, has been to separate the bale into packs of leaves, and then separate these packs into the layer condition by a hand "picking" action. Hand "picking" of leaves is comparatively expensive since the "picking" operation is more or less tedious and consequently the output of an operative is more or less limited, in addition to which the monotony of the "picking" action tends to reduce such output.

In companion applications filed April 12, 1917, and July 10, 1916, I have disclosed various ways in which the "picking" operation may be provided mechanically. These applications disclose mechanisms which may provide separation by a flexing action on the pack, or by pack manipulations in which a face of the pack is temporarily affixed or supported and pressure applied to the pack for the purpose of reducing or practically eliminating the facial cohesion between pack leaves, or in which both types of mechanism may be employed, the flexing mechanism serving to loosen the pack preliminary to the operation of the other type of mechanism.

In the present application the separation of the pack leaf layers is produced by the use of pulling strains exerted from opposite faces of the pack, and the invention consists generally in such method of pack manipulation and the arrangement and combination of parts adapted to carry out such methods, hereinafter more fully described, illustrated in the accompanying drawings, and more particularly pointed out in the appended claims.

In the accompanying drawings in which similar reference characters indicate similar parts in each of the views:

Figure 1 is a diagrammatic view partly in section and partly in elevation of one form of apparatus adapted to carry out the principles of the present invention.

Figs. 2, 3, 4 and 5 are diagrammatic views of portions of apparatus showing other ways in which the principles of the invention may be provided.

Fig. 6 is a detail plan view partly in section of an arrangement shown in Figs. 3 and 5.

Fig. 7 is a sectional view taken on line $x$—$x$ of Fig. 6.

Fig. 8 is a diagrammatic view indicating other ways in which the principles of the invention may be carried out.

Fig. 9 is a fragmentary sectional view taken on line $y$—$y$ of Fig. 2.

As heretofore indicated, the present invention is designed more particularly to operate by applying pulling strains, these being exerted from opposite faces of the pack. This action, when properly produced, will provide separation of a leaf layer or layers without materially injuring the leaf conformation, thus reducing the tendency of the formation of scrap. To produce this action, the strains should be exerted more or less gently and yet with positiveness in order that the fragile leaf conformation be effected to least possible extent, and yet be effective to cause the uniting medium to lose its uniting effect. As will be understood, another desirable effect is to produce this separating action with expedition so that the output of the "picking" operation may be largely increased.

In the drawings I have shown a number of ways in which the invention may be carried into effect. In each, the pack is moved through a travel path and during its movement through such path the opposite faces of the pack are temporarily affixed to traveling elements between which the pack passes and, as the pack passes from between such elements the opposite pack faces recede relatively to each other, and since the faces are more or less affixed to the elements or carriers, opposing pulling strains are placed on the pack. Since the means by which a face of the pack is held to a member or carrier is physically effective for but a small distance into the body of the pack—although the normal cohesion between the leaves is sufficient to permit the entire pack to be carried when either face is so affixed—receding of the opposite affixed layers will tend to open the pack into at least two parts, the action generally being to provide the loss of the uniting effect between leaves adjacent one or the other point where the holding effect of the facial layer becomes ineffective, the remainder of the pack generally continuing the travel with the other face layer. As the opposing leaf-holding means preferably do not have overlapping zones, it will be readily understood that there is no violent pulling action at any particular point between the holding zones, so that the separating action is more or less gentle in effect, thus leaving the leaf practically unimpaired as to its texture and other general conformations.

In the present invention I may employ either a suction means or a leaf-impaling means for the purpose of temporarily affixing the opposite faces of the pack, or I may employ a combination of these means, the drawings indicating various ways in which the general result can be obtained. Both types of face-affixing means are more specifically disclosed in companion applications in which but one face of the pack is so affixed and in which the strains are applied in a different manner. In the present application, therefore, the structures shown are indicated more or less diagrammatically.

The arrangement shown in Fig. 1 indicates diagrammatically a suction drum 15 mounted above an endless conveyer 16, the latter being adapted to receive the packs in suitable manner as from a hopper 17. The drum 15 is of the type shown in my companion application filed July 10, 1916, Serial No. 108,519, in which an annular perforated shell $15^a$, supported by a rotating side of the drum (not shown) forms the outer wall of a two-compartment drum, the compartments being produced by a wall $15^b$ carried by the opposite stationary end of the drum. Compartment $15^c$ is connected to a suitable suction-creating mechanism by a connection $15^d$. This causes compartment $15^c$ to form a suction chamber effective on those perforations of shell $15^a$ which may be open to such compartment. Consequently, a pack traveling on conveyer 16 and reaching a point where the suction action is effective thereon, will become affixed to the drum through contact of the pack with the periphery of the shell, the pack then being carried by such face off of the conveyer. Travel of the held or affixed pack will continue until the suction action is withdrawn by this portion of the shell periphery passing out of communication with the suction chamber, whereupon the portion of the pack which is present on the shell periphery at this time will be free from suction holding and in condition for removal from the drum. This latter action may be provided by simply permitting the pack to drop off or it may be brushed off as by a brush $15^e$ or it may be blown off by fluid pressure introduced into compartment $15^f$ through a pipe $15^g$. This general arrangement may be considered as a pack carrier or support.

An alternate form of carrier may be provided by a structure indicated diagrammatically in Figs. 4, 5 and 6 in which a drum 18, having an annular face, is provided with a series of annular strips $18^a$ carrying pins of comparatively short length and preferably sharpened, this arrangement being more particularly shown and described in my companion application, filed April 12, 1917, Serial No. 161,541, the strips being spaced apart to receive leaf stripping structures, indicated in the drawings as strippers 19, but which may be of any other arrangement, such for instance, as wires or tapes, as shown in said application. As described in said companion application, the pins may extend radially or more or less tangentially of the strip face, the present drawings simply indicating a radial configuration.

In this latter form, travel of a pack brings its upper face into the path of movement of pins of the drum face which impale such face and project a short distance into the traveling pack, thus causing the pack to become affixed to the face of the drum and be carried by the latter to a point where the strippers, which extend beneath the leaf layer or pack, become effective and strip the layers or pack from the impaling pins.

As heretofore pointed out, the pack is subjected to opposing pulling strains, and, in the present form of the invention, this action is brought about by the use of one or more rotating devices adapted to provide a temporarily affixed relation with the opposite face of the pack, these devices being preferably arranged in the travel path of the pack carried by drum 15 or drum 18, as shown diagrammatically in Fig. 1, being preferably arranged to operate successively on the pack during its travel and, to accommodate for reduction in pack thickness are preferably located at successively decreased distances from the face of such drum.

These devices may be of either the suction or the pin impaling type, as indicated for instance in Figs. 2 and 3, and are preferably of materially decreased diameter from the diameter of the drum. Where the device is of the suction type, as shown for instance in Figs. 2 and 4 in which the rotating face of the device—which may termed a picker—is indicated at 20, the general arrangement is more or less similar to drum 15 in having a suction compartment effective on a restricted portion of the picker, the position of the compartment being such that suction action may become effective on a pack while being carried through the space between the drum and the picker, as indicated in Fig. 2. Consequently, when a pack is carried into this space by the drum rotation, and the pack is of sufficient thickness to bring the exposed face within the influence of the suction action, the outer face of the pack will become temporarily affixed to the picker, and, since both are rotating in directions to provide recession of pack faces beyond the space or throat between the drum and picker, the pack will be subjected to pulling strains exerted in opposite directions from the pack faces without material violence and thus cause the uniting medium between leaves to lose its uniting effect at some point intermediate the faces. Inasmuch as the arc of the picker face is of less radius than that of the drum, this separation will generally take effect at a point closer to the outer face of the pack owing to the greater curvature of the picker face, although this action may, of course, be reversed.

The pack, in continuing its travel passes into the influence of the picker face of the next device where the action is repeated on the reduced pack, the pack then passing on through the successive throats. Obviously, the pack thickness may be such as to be operative only with the later devices of the series but owing to the difference in width of the throats, the pack will be acted on when the proper width of throat is reached.

As shown in Fig. 6, I prefer to mount the picker yieldingly in any suitable manner, as by the use of spring supported bearings 21. Where the picker is of the suction type, I may arrange the face as in Fig. 9 wherein annular grooves 20ª are formed within which strippers 19 may extend, as indicated in Fig. 2, it being readily understood that as the picker rotates and carries the leaf layer or pack portion on its periphery, such layer is carried to a point where the suction effect is eliminated, the leaf layer or pack portion passing on to the strippers which carry it to a suitable point.

As shown in Figs. 3 and 5, the picker may be of the pin impaling type, this type of picker being indicated generally at 22, the stripper action heretofore indicated being preferably employed.

As will be readily understood from the drawings, the particular character of the drum or the pickers may vary. For instance, in Fig. 2 both are of the suction type, while in Fig. 5 both are of the pin impaling type. In Fig. 3 the drum is of the suction type and the picker of the impaling type, while in Fig. 4 these are reversed. In each form, however, there is provided means for producing pulling strains exerted on the pack from the opposite pack faces.

While I have shown in Fig. 1 the use of four pickers in connection with the drum, it will be readily understood that this number may be varied to meet conditions, a single picker being considered as falling within the general principles of the invention as well as do a plurality of pickers.

It is also to be understood that in employing a plurality of pickers, they may be of different types, since it may be preferable to employ one type where the pack is of considerable thickness, and a different type when the pack thickness is reduced. This is shown more or less diagrammatically in Fig. 8 where pickers of both types are indicated as coöperating with a pack carrier in the form of a conveyer 23 carrying impaling pins. Obviously, the pickers coöperating with such conveyer may be all of the same type and arranged to provide the successive width decrease of the throats into which the pack is carried by the conveyer, the movements of the conveyer and picker likewise producing pulling strains exerted from opposite faces of the pack.

While not shown in the drawings, it is to be understood that I may, if found desirable, provide a preliminary loosening of the pack by the use of flexing mechanism as indicated in the companion applications. It will also be understood that the general types of structures shown herein may be substituted for structures in the apparatuses disclosed in the companion applications.

While I have herein shown and described several ways in which the general principles of the invention may be carried into effect, it will be understood that the structures shown are more or less illustrative and are subject to such changes and modifications as may be found necessary or desirable to meet the exigencies of installation and use. I therefore desire to be understood as reserving the right to make any and all such changes or modifications as may be required or desired, in so far as the same may fall within the spirit and scope of the invention as expressed in the accompanying claims which are to be considered in their broadest aspect.

Having thus described my invention, what I claim as new, is:

1. The method of separating the leaves of a pack of superposed tobacco leaves wherein the leaves are facially but separably united, which consists in subjecting the pack to opposed pulling strains exerted from opposite faces thereof to cause a separation of pack leaf layers.

2. In the treatment of packs of facially cohering tobacco leaves to separate a portion from the pack, the method of picking the pack which consists in bringing a face of the pack into affixed relation to a moving support, and applying a pulling strain on the pack leaf layers exerted from the opposite face of the pack.

3. In the treatment of packs of facially cohering tobacco leaves to separate a portion from the pack, the method of picking the pack which consists in bringing the opposite faces of the pack into affixed relation to independent supports, and moving the supports to produce opposed pulling strains on the pack leaf layers exerted from its opposite faces.

4. In the treatment of packs of facially cohering tobacco leaves to separate a portion from the pack, the method of picking the pack which consists in bringing a face of the pack into affixed relation to a moving support, affixing the opposite face to an independent moving support, and separating leaf layers from the moving pack by pulling strains exerted from opposite faces of the pack, removing the separated leaves and then affixing the new pack face thus produced and repeating the separating action.

5. In the treatment of packs of tobacco leaves wherein the leaves are facially but separately united, mechanism for stripping leaves from the pack, comprising spaced rotatable means between which the pack of leaves is caused to move, and means carried by said rotatable means and rendered active upon opposite faces of the pack for advancing the pack and exerting opposed pulling strains upon different leaf portions thereof whereby leaves are stripped from the pack during movement of the latter between said rotatable means.

6. In the treatment of packs of tobacco leaves, wherein the leaves are facially adherent, movable means for temporarily affixing a face of the pack to support the pack, movable means spaced from said first named means for temporarily affixing the opposite pack face, and means for imparting motion to both said movable means whereby said affixed pack faces will be moved in directions to provide pulling strains on the pack exerted from such affixed pack faces to separate leaves therefrom.

7. In the treatment of packs of tobacco leaves wherein the leaves are facially adherent, a movable pack carrier having means for temporarily affixing a face of the pack thereto, and rotatable means in the path of pack travel for temporarily affixing the opposite face of the pack, said carrier and rotatable means coöperating to provide pulling strains on the pack exerted from the opposite pack faces to separate leaves therefrom during movement of the pack between the carrier and said rotatable means.

8. In the treatment of packs of tobacco leaves wherein the leaves are facially adherent, a pack carrier having means for temporarily affixing a face of the pack thereto, and a rotating picker located in the pack travel path for temporarily affixing the opposite face of the pack, said carrier and picker being movable in directions to cause said opposite affixed faces to recede from each other, whereby pulling strains will be placed on and exerted from opposite faces of the pack.

9. In a machine for separating the facially cohering leaves of a pack of leaves and in combination, a movable carrier, and a rotatable picker coöperatively associated therewith, said carrier and picker each having means for temporarily affixing a pack face thereto and operable during movement to separate leaves from leaf packs fed therebetween.

10. In a machine for separating the facially cohering leaves of a pack of tobacco leaves and in combination, a traveling carrier, and a traveling picker coöperatively associated therewith, such carrier and picker being relatively positioned to form a throat therebetween for the reception of packs of tobacco leaves and said carrier and picker each having means for temporarily affixing opposite faces of a pack thereto within such throat, and means for causing uniform movements of the carrier and picker to separate leaves from packs fed through the throat.

11. In a machine for separating the facially cohering leaves of a pack of tobacco leaves and in combination, a rotatable pack carrier having means at its periphery for causing a face of a pack of leaves to cling thereto and thus support the pack, and a plurality of rotatable pickers operative adjacent the exposed peripheral face of and at successive points in the travel of the pack, said pickers operating to cause a separation of the leaf layers of the pack during movement of the latter.

12. In a machine for separating the facially cohering leaves of a pack of tobacco leaves and in combination, a rotatable pack carrier having means for temporarily affixing a pack face thereto to support the pack, and a plurality of pickers operative on the exposed face of and at successive periods in the travel of the pack, said pickers each having means for temporarily affixing such exposed face of the pack thereto.

13. In combination, a rotatable pack carrier having means for temporarily affixing a pack face thereto to support the pack, and a plurality of rotatable pickers mounted in the path of travel of the pack so supported, each picker having means for temporarily affixing the exposed face of the pack thereto, said pickers being positioned to operate successively on the pack.

14. In combination, a pack carrier having means for temporarily affixing a face of the pack thereto to support the pack, and a plurality of rotatable pickers positioned opposite the carrier to form a series of throats through which the pack is carried, each picker having means for temporarily affixing thereto the exposed face of the pack entering the throats.

15. In combination, a pack carrier having means for temporarily affixing a face of the pack thereto to support the pack, and a plurality of rotatable pickers positioned opposite the carrier to form a series of throats through which the pack is carried, each picker having means for temporarily affixing thereto the exposed face of the pack entering the throats, said pickers being relatively positioned to produce throats of decreasing width in the direction of advance of the pack.

16. In the treatment of packs of tobacco leaves wherein the leaves are facially adherent, a mechanism for separating the leaf pack layers, comprising a traveling carrier for delivering the leaf packs, a rotatable drum having its periphery positioned adjacent the pack-supporting face of the carrier, said drum having peripheral means for causing leaf packs fed by the carrier to cling thereto, and a second drum arranged adjacent the first-named drum operating to assist in the leaf separating action, said second-named drum also having peripheral means for causing leaves to cling thereto.

17. In the treatment of packs of tobacco leaves wherein the leaves are facially adherent, mechanism for separating the leaf pack layers, comprising a traveling carrier for delivering the leaf packs, a rotatable drum having its periphery positioned adjacent the pack-supporting face of the carrier, said drum having peripheral means for causing leaf packs fed by the carrier to cling thereto, and a second drum arranged adjacent the first-named drum operating to assist in the leaf separating action, said second-named drum also having peripheral means for causing leaves to cling thereto, and means for causing the clinging leaves to be detached from the said rotating drums.

In testimony whereof I affix my signature.

JAMES B. HARRISS.